Patented Apr. 8, 1930

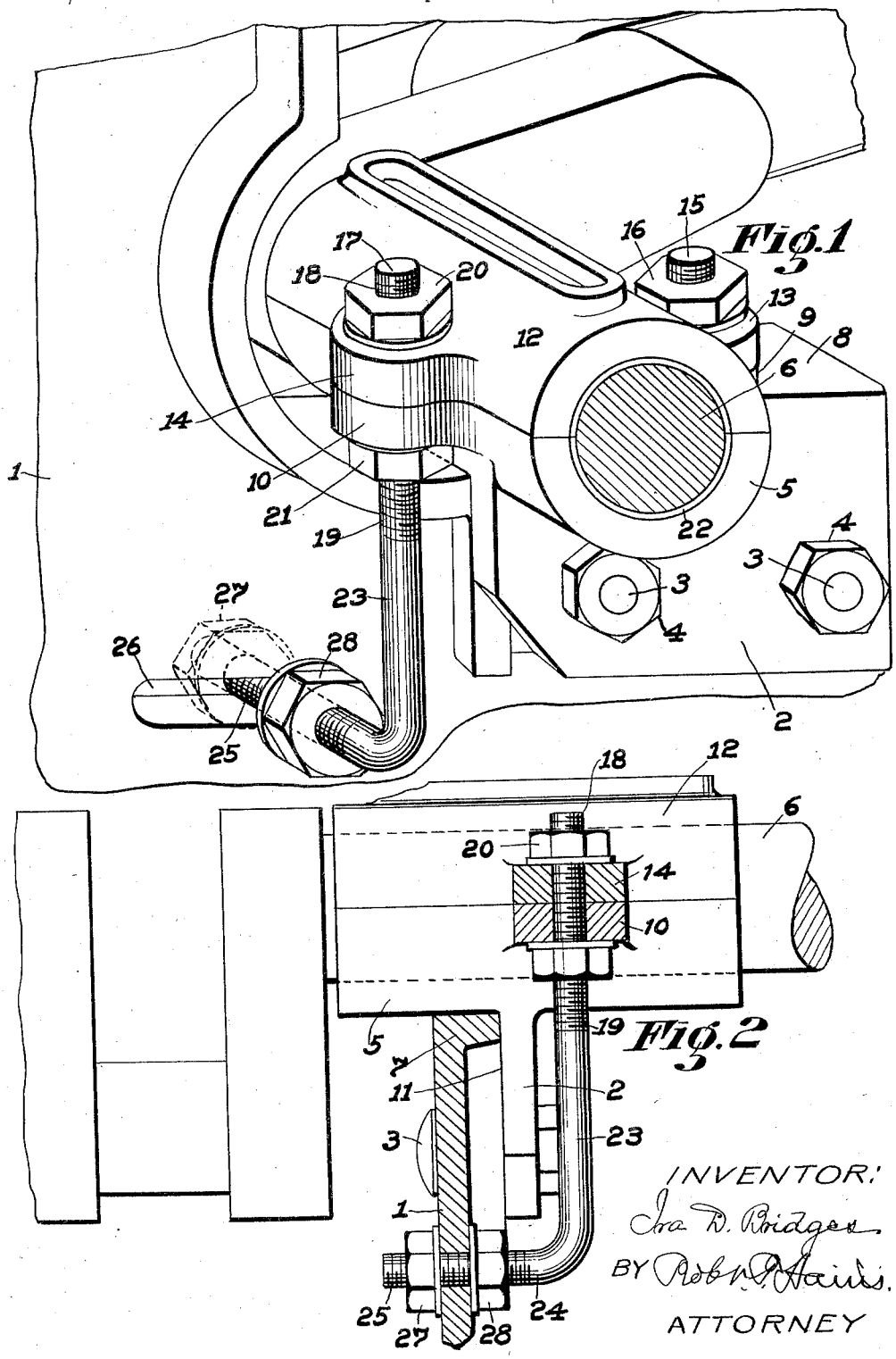

1,754,195

UNITED STATES PATENT OFFICE

IRA D. BRIDGES, OF SANFORD, NORTH CAROLINA, ASSIGNOR TO DRAPER CORPORATION, OF HOPEDALE, MASSACHUSETTS, A CORPORATION OF MAINE

LOOM CRANK-SHAFT BOX-CAP BEARING

Application filed April 6, 1928. Serial No. 268,024.

This invention relates to looms and is more particularly directed to the crank shaft bearing for looms.

It is now the common practice to provide the loom frame with bearings for the crank shaft at opposite sides thereof, but the severe strains to which the crank shaft bearings are subjected during weaving operations, owing to the weight and rapid change of movements of the lay, are liable to cause the bearings to become displaced upon the loom frame, and especially is this observable in high speed looms or where the lay itself is of unusual weight.

The strains to which the crank shaft bearings are subjected are more prominently manifested when the lay is either at front center or back center, owing to the constant change of movement, and these strains have frequently caused the crank shaft bearings themselves to become loose or displaced, an objectionable condition by reason of the fact that imperfect cloth is liable to be woven under such conditions.

The present invention has for its object the provision of additional means for anchoring the crank-shaft bearing to the loom frame to further resist the tendency of the bearing to work loose under the strains and jars to which it is subjected during weaving.

The invention and novel features thereof will best be made clear from the following description and the accompanying drawings of one good form thereof.

In the drawings:

Fig. 1 is a perspective view of one of the crank shaft bearings having the present invention associated therewith; and Fig. 2 is a rear elevation of the bearing, some of the parts being shown in section.

The loom frame comprises side frames 1, one at each side of the loom, and the side frames themselves are provided with the crank shaft bearings, but since such bearings at each side of the loom may be of the same general construction, only one of them is shown in the drawings, it being understood that the opposite bearing may be similarly constructed.

Secured to the loom frame side is a bracket 2 which may be appropriately held in place by threaded bolts 3 which pass through the bracket and the adjacent side frame and are held in place by suitable nuts 4.

In the construction shown, the bracket 2 has formed integral therewith the lower bearing 5 for the crank shaft 6, and such bearing 5 (as indicated in Fig. 2) rests upon the flange 7, formed as a part of the loom frame. Extending frontwardly from the bearing portion 5 of the bracket is the ledge 8 (Fig. 1) which likewise overlies the flange 7 of the loom frame, to thereby assist in maintaining the bracket in proper position or clamped in place and resist the strains to which the crank shaft is subjected as the lay changes the direction of movement in one position.

The lower bearing 5 of the crank shaft has at the front a lug 9 (indicated in Fig. 1) and at the rear thereof a similar lug 10, both of which may be conveniently formed integral with the lower bearing 5 and bracket 2, and the lug 10 is shown as extending rearwardly beyond the supporting bracket 2. When the bracket 2 is secured to the loom frame by the bolts 3 and nuts 4, as previously described, the inner face 11 of the bracket is clamped against integral lugs or ribs formed upon the sides of the loom frame (as indicated in Fig. 2).

Above the lower bearing 5 is the box or bearing cap 12 which preferably is coextensive with the lower bearing 5, and projecting from each side of the box cap are the lugs 13 and 14. Passing through the lug 13 at the front of the bearing is a threaded bolt 15 which secures the front portion of the box cap to the lower bearing or bracket 5, an appropriate nut 16 being utilized for this purpose.

As above stated an object of the present invention is to secure the crank-shaft bearing more rigidly to the loom frame so that the tendency of the same to work loose will be reduced, and in this connection simple means is provided, in accordance with the present invention, for rigidly securing the rear portion of the crank-shaft bearing to the loom frame.

This additional anchoring means for the bearing consists of a comparatively long bolt 17 the upper portion of which is constructed to extend through the lugs 10 and 14 and is provided with the threaded portions 18 and 19 which receive the nuts 20 and 21 for properly securing the back portion of the cap and the back portion of the lower bearing in their associated relations (as indicated in Fig. 1).

The inner portion of the box cap and the lower bearing 5 may be appropriately lined with suitable material 22 to take the wear of the rotating crank shaft 6.

The elongated stud bolt 17 has the downwardly extended portion 23 which is turned laterally at its lower end at 24, and the laterally extending end 24 is provided with a screw thread 25.

The loom frame 1 is provided with an elongated slot 26 through which the threaded end 25 of the stud bolt passes when the parts are in assembled condition (as indicated in Figs. 1 and 2) and threaded nuts 27 and 28 on the laterally turned end of the stud bolt serve to secure or anchor the stud bolt to the loom frame, the result being that when the crank shaft bearing is submitted, to the unusual strains by the change of motion of the lay, the rigid connection between the rear portion of the crank-shaft bearing and loom frame afforded by the stud bolt 17 will absorb such strains, either in an upward or downward direction, thereby serving to anchor the bearing rigidly in place.

From the construction described as one good form of the present invention, it will be apparent that the elongated stud bolt 17 not only serves to secure the box cap and lower bearing in their associated relation, but since its lower extended end portion is anchored to the loom frame in the manner hereinbefore described, both the upward tensile and downward thrust strains submitted to the bearing during the change of motion of the lay will be absorbed by the stud bolt in transmitting these strains to the rigid side frame of the loom.

The elongated slot 26 in the loom frame to which the lower end of the stud bolt is anchored, permits adjustment of the stud bolt to suit varying conditions and sizes of bearings and the caps.

What is claimed is:

1. A lay crank shaft bearing for looms, comprising, in combination, a bracket secured to the loom frame and having a lower bearing for the crank shaft, a box cap, projecting lugs on said bearing and cap, a bolt for securing the box cap at one side of the bearing, an elongated stud bolt adapted to engage said lugs for securing the box cap at the other side of the bearing and having its lower extended end turned laterally, and means for securing the laterally turned end of the elongated stud bolt to the loom frame to cause this bolt to directly support said lugs and resist the strains of lay movement by the crank shaft.

2. A lay crank shaft bearing for looms, comprising, in combination, a bracket secured to the loom frame and having a lower bearing for the crank shaft, a box cap, rearwardly extending lugs on said bearing and cap, a bolt for securing the box cap at one side of the bearing, an elongated stud bolt adapted to engage said lugs for securing the box cap at the other side of the bearing and having its lower extending end turned laterally and screw threaded, the loom frame having a slot through which the laterally turned end of the elongated stud bolt passes, and securing nuts for securing the turned end of the stud bolt to the loom frame to cause this bolt to directly support the portion of the bearing to which the lugs are secured.

3. A lay crank shaft bearing for looms, comprising, in combination, a bracket secured to the loom frame and having a lower bearing for the crank shaft, a box cap secured to the bracket and lower bearing at the front thereof, rearwardly extending lugs on said bearing and cap, an elongated stud bolt adapted to engage said lugs for securing the box cap at the back of the bearing and having its lower end extended laterally, the loom frame having an elongated slot through which the laterally turned end of the stud bolt passes, and nuts threaded to the laterally turned end of the stud bolt at opposite sides of the loom frame for adjustably securing the stud bolt thereto to directly support said lugs and resist the strains of lay movement by the crank shaft.

4. In a loom, the combination of the frame and lay crank shaft, a bracket secured to the loom frame and having a lower bearing for the crank shaft, a box cap containing the upper bearing, lugs at the front and rear of said bearings the rear lugs being positioned to project rearwardly beyond the base of the bracket, a bolt for securing the lugs together at the front of the bearings, an elongated threaded stud bolt passing through the back lugs and extending downwardly therefrom, nuts on the stud bolt for securing the back lugs together, and means for anchoring the extended lower end of the stud bolt to the loom frame to directly support said rear lugs and resist the strains of lay movement by the crank shaft.

In testimony whereof, I have signed my name to this specification.

IRA D. BRIDGES.